UNITED STATES PATENT OFFICE.

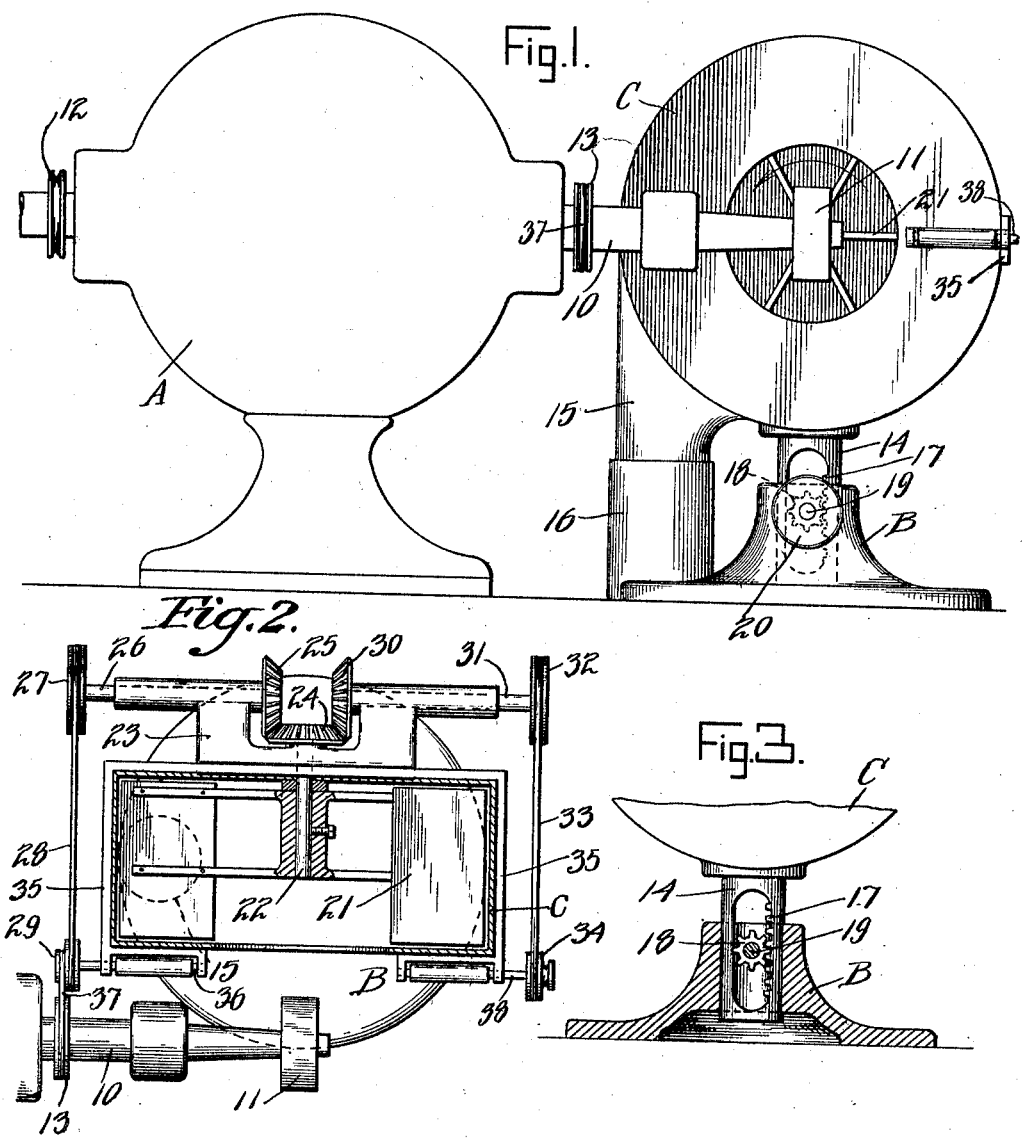

GEORGE M. WOLPE, OF INDIANAPOLIS, INDIANA.

DUST-COLLECTOR.

1,315,066.  Specification of Letters Patent.  Patented Sept. 2, 1919.

Application filed January 20, 1919. Serial No. 272,113.

*To all whom it may concern:*

Be it known that I, GEORGE M. WOLPE, a citizen of the United States, residing at Indianapolis, Marion county, and State of Indiana, have invented and discovered certain new and useful Improvements in Dust-Collectors, of which the following is a specification.

My said invention consists in providing an attachment for dental lathes or grinders for the purpose of collecting and carrying away the dust, spray or particles resulting from the work and thus enabling said work to be accomplished in a more sanitary and pleasant manner, all as will be hereinafter more fully described and claimed.

Referring to the accompanying drawing which is made a part hereof and on which similar reference characters indicate similar parts.

Figure 1 is a view showing a dental lathe and my attachment therefor in front elevation:

Fig. 2 is a horizontal sectional view diametrically of the fan and housing and

Fig. 3 is a detailed view showing the adjusing means more clearly.

In said drawing the portions marked A represent the motor or lathe, B the base for the dust collector, and C the casing therefor.

The lental lathe A is of any appropriate type or construction having a spindle 10 for carrying the grinding wheel 11, or other tool, on either end thereof, and is driven by any appropriate power, preferably an electric motor, the power being usually applied through a pulley 12 on the end of said spindle. Another pulley 13 is mounted on the spindle or shaft 10 for driving the fan of the "dust" collecting attachment.

The base B of the attachment is of any appropriate size and construction, preferably provided with a central socket to receive the shank of the fan casing.

The fan casing C is likewise of any appropriate construction and material, being mounted on the shank 14 in the socket in said base B and provided with a discharge spout 15 adapted to slide within a receiving pipe 16, provided to receive the discharge from said fan. The shank 14 is formed with a vertical slot and with a rack-bar or teeth 17 on one side thereof. A pinion 18 is mounted on a cross shaft 19 and provided with a hand-wheel 20, and provides means for the vertical adjustment of said shank and the casing carried thereby. A fan 21 is mounted on a shaft 22 in said fan casing, said shaft 22 being journaled in a bracket 23 secured to the rear side of said casing and having a miter-gear wheel 24 on its outer end. Said miter-gear wheel 24 meshes with a similar gear wheel 25 on a shaft 26 also journaled in said bracket 23 at right angles to shaft 22 and is provided with a grooved pulley 27 on its outer end which is connected by a belt 28 to the pulley 29 which is connected to pulley 13 on the spindle 10 by a belt 37.

A second shaft 31 similar to shaft 26 is mounted in a corresponding bearing on the opposite side of the casing and has a gear 30 which likewise meshes with gear 24. Shaft 31 also has a pulley 32 and a belt 33 connects said pulley with a pulley 34 on a short shaft 38, corresponding to shaft 36 on the other side of the casing. Pulleys 29 and 34 are double-faced pulleys each of which is adapted to be connected by a belt 37 to the pulley 13 on the spindle 10. By this means the dust collector casing may be shifted from one side of the lathe or dental engine to the other according to the side on which the work is being done, it being understood that most types of dental engines provide a tool for grinding or polishing on each end of the spindle.

It will thus be seen that when the engine or motor is driving the spindle 10, and the attachment is connected up to the working side of the lathe, the fan 21 will also be driven, operating to create a suction from the point of the work to within the eye of the fan and draw in all dust and grit resulting from the operation of the tool on the spindle as well as the spray from the water used on the work, and discharge the same through spout 15 and pipe 16, thus keeping the work clean and free from disagreeable results, such as the throwing of the grit and dirty water into the face of the operator, and covering his clothing and the surroundings therewith.

By reason of providing an adjustable support for said fan casing C, the operator is enabled to exactly center the eye of the fan in line with the axis of the spindle 10 or in the most advantageous position for insuring the perfect operation of the device. The water dripping upon the grinding wheel 11, as well as the grit and dust formed by the operation, is sucked into the fan instead of being sprayed and spattered over the work, the operator and the surroundings.

Having thus fully described my invention, what I claim as new and desire to secure by Letters Patent is:

1. A dust collector having a cylindrical housing having an opening spanning its axis, a centrifugal fan journaled upon the axis of the housing, alined counter shafts journaled upon the housing and perpendicularly to the fan journal, means to transmit motion from the counter shafts to the fan, other shafts parallel with the counter shafts and journaled upon the housing opposite the counter shafts, transmission means between the several shafts, and means to apply motive power to the second mentioned shafts.

2. A dust collector comprising a cylindrical housing having an opening spanning its axis, means to adjust the housing vertically, a centrifugal fan journaled upon the axis of the housing, alined counter shafts journaled upon the housing and perpendicular to the fan journal, means to transmit motion from the counter shafts to the fans, other shafts parallel with the counter shafts and journaled upon the housing opposite the counter shafts, transmission means between the several shafts, and means to apply motive power to the second mentioned shafts providing for the vertical adjustment.

3. A dust collector comprising a cylindrical housing with an opening spanning its axis, a centrifugal fan journaled within the housing and upon its axis, means to apply motive power to the shafts at the side of the housing opposite the opening, means to apply motive power at the side of the housing including the opening and selectively upon either side of said opening, and means to transmit the motive power from the front to the back of said housing.

In witness whereof, I have hereunto set my hand and seal at Indianapolis this 6th day of January, A. D. nineteen hundred and nineteen.

GEORGE M. WOLPE. [L. S.]

Witness:
M. L. SHULER.

Copies of this patent may be obtained for five cents each, by addressing the "Commissioner of Patents, Washington, D. C."